United States Patent
Goenka et al.

(10) Patent No.: US 11,042,596 B2
(45) Date of Patent: Jun. 22, 2021

(54) PRESERVING CONTEXTUAL RELEVANCE OF CONTENT

(71) Applicant: Yahoo Holdings, Inc., Sunnyvale, CA (US)

(72) Inventors: Mohit Goenka, Santa Clara, CA (US); Ashish Khushal Dharamshi, Sunnyvale, CA (US); Nikita Varma, Milpitas, CA (US)

(73) Assignee: Verizon Media Inc., New York, NY (US)

( * ) Notice: Subject to any disclaimer, the term of this patent is extended or adjusted under 35 U.S.C. 154(b) by 485 days.

(21) Appl. No.: 15/721,550

(22) Filed: Sep. 29, 2017

(65) Prior Publication Data

US 2019/0102464 A1    Apr. 4, 2019

(51) Int. Cl.
| | |
|---|---|
| *G06F 16/9535* | (2019.01) |
| *G06F 16/435* | (2019.01) |
| *G06F 16/2457* | (2019.01) |
| *H04L 12/58* | (2006.01) |
| *G06Q 10/04* | (2012.01) |
| *G11B 27/34* | (2006.01) |

(52) U.S. Cl.
CPC .... *G06F 16/9535* (2019.01); *G06F 16/24575* (2019.01); *G06F 16/435* (2019.01); *G06Q 10/04* (2013.01); *G11B 27/34* (2013.01); *H04L 51/063* (2013.01); *H04L 51/10* (2013.01)

(58) Field of Classification Search
USPC ........................................................ 707/722
See application file for complete search history.

(56) References Cited

U.S. PATENT DOCUMENTS

| | | | |
|---|---|---|---|
| 8,380,721 B2 * | 2/2013 | Attaran Rezaei ... | G06F 21/6218 707/748 |
| 9,582,482 B1 * | 2/2017 | Sharifi ................ | G06F 16/2228 |
| 2001/0049671 A1 * | 12/2001 | Joerg .................... | G06F 16/951 706/50 |
| 2007/0038600 A1 * | 2/2007 | Guha .................... | G06F 16/951 |
| 2009/0006285 A1 * | 1/2009 | Meek .................... | G06Q 10/10 706/12 |
| 2009/0164572 A1 * | 6/2009 | Charlton ............... | G06F 40/169 709/204 |
| 2009/0171932 A1 * | 7/2009 | Yahia .................... | G06Q 10/10 |
| 2009/0282327 A1 * | 11/2009 | Hamilton, II ....... | G06F 16/9577 715/231 |

(Continued)

*Primary Examiner* — Cam Linh T Nguyen
(74) *Attorney, Agent, or Firm* — Cooper Legal Group, LLC

(57) ABSTRACT

Devices often receive content items to be saved for later presentation to a user. In some instances, the content of the message is analyzed to retrieve supplemental information from external data sources, such as a map to a location discussed in a message. However, such supplementing often fails to reflect the personal context of the content item to the user, who may not easily recall the associated personal context when the content item is later presented. Instead, for a content item to be saved, a device may evaluate personal data sources to identify the personal context of the content item to the user, and add personal context annotations to a content item record of the saved content item. Later, during a presentation of the content item to the user, the personal context annotations may be included as a reflection of the personal context of the content item to the user.

20 Claims, 10 Drawing Sheets

(56) References Cited

U.S. PATENT DOCUMENTS

| | | | |
|---|---|---|---|
| 2010/0005061 A1* | 1/2010 | Basco | G06F 16/355 704/9 |
| 2010/0005087 A1* | 1/2010 | Basco | G06F 16/951 707/E17.017 |
| 2010/0223261 A1* | 9/2010 | Sarkar | G06F 16/38 707/726 |
| 2010/0325557 A1* | 12/2010 | Sibillo | G06F 3/0481 715/751 |
| 2013/0159926 A1* | 6/2013 | Vainer | G06F 16/24575 715/804 |
| 2015/0120648 A1* | 4/2015 | Slovacek | G06F 16/41 707/609 |
| 2016/0034512 A1* | 2/2016 | Singhal | G06F 16/35 707/737 |
| 2016/0112487 A1* | 4/2016 | Wang | H04L 65/605 709/201 |
| 2016/0224527 A1* | 8/2016 | Nayar | G06Q 30/02 |
| 2016/0225059 A1* | 8/2016 | Chow | G06Q 30/0282 |
| 2017/0004139 A1* | 1/2017 | Wong | G09B 5/02 |
| 2017/0034087 A1* | 2/2017 | Borenstein | H04L 51/08 |
| 2017/0103071 A1* | 4/2017 | Albouyeh | G06F 16/907 |
| 2018/0144052 A1* | 5/2018 | Sayyadi-Harikandehei | H04N 21/231 |

\* cited by examiner

PRESERVING CONTEXTUAL RELEVANCE OF CONTENT

BACKGROUND

Within the field of computing, many scenarios involve content items that are transmitted to a user, such as public and private messages such as email, text messages, and social network comments; documents such as web pages; and media such as images, audio, and video. Such content may be discovered by the user through browsing or search; transmitted to the user by an individual or a process; or recommended to the user by a recommendation service.

In such scenarios, users often wish to save the content item, such as bookmarking the location of a web page; saving an email message in an archive; or storing an entry in a calendar for an event. In such scenarios, a device of the user may seek to augment certain aspects of the content item with supplemental information from public sources. As a first example, a bookmark for a web page may include supplemental information such as a synopsis of the web page or a set of related links that involve the same topic. As a second example, an email message that references a resource, such as a flight that the user has reserved, may be annotated with further information about the flight, such as its departure or arrival times. As a third example, a calendar entry for an event occurring at a particular location may be supplemented with a map to the location, and contact information for other individuals who are listed as attending the event. Such supplemental information may provide some context for the content item, and may be useful to the user in the context of the content item (e.g., when the user seeks to travel to an event associated with a calendar item, the presentation of a map to the location may facilitate the user's travel, and the presentation of contact information of other attendees may enable the user to contact such individuals upon arrival). In this manner, an automated supplementing of content items with related information may be convenient and timely for the user.

SUMMARY

Conventional techniques that supplement a content item with additional information often fail to capture a significant aspect of such context: the personal context of the content item, i.e., the personal relevance of the content item to the user.

As a first example, when a user bookmarks a web page, a web browser may store supplemental information about the web page, such as its name and a synopsis of its content. However, this information may not indicate the relevance of the web page to the user—i.e., which aspect of the web page the user found to be related to the user's interests. When accessing the web page at a later time, the user may have forgotten the relevance of the web page to the user, and may have difficulty recalling why the user chose to save it. An automated annotation of the bookmark with further information about the website, e.g., its name, author, and date of creation, may be of little assistance for reminding the user of the personal context of the web page, i.e., the relevance of the web page to the user's interests.

As a second example, when a user receives an email message for a personal flight reservation, the user may have initiated the reservation in order to attend a particular event. However, a user who travels frequently may not remember the particular circumstances of each flight, and when presented with the email message and flight details at a later time, the user may have difficulty recalling the user's intended purpose for this instance of travel. An automated annotation of the email message with further information about the flight, such as its departure and arrival times, may be of little assistance for reminding the user of the personal context of the email message, i.e., the relevance of the flight to the user's interests.

As a third example, when a user creates a calendar entry for an event such as a meeting with some individuals, the user and the individuals may have chosen the meeting to discuss a particular topic. However, when presented with a reminder of the meeting at a later date, the user may have difficulty recalling the user's role in the meeting, such as the subject matter that the user wished to discuss, or information that the individuals expect the user to share at the meeting. An automated annotation of the meeting reminder with further information about the meeting, such as the map of its location and the contact information of other attendees, may be of little assistance for reminding the user of the personal context of the email message, i.e., the relevance of the meeting to the user's interests.

Presented herein are techniques that enable devices to preserve the contextual relevance of stored content items to the user, such that a later presentation of the content item may be annotated with a description of the personal contextual or relevance of the content item to the user's interests. In accordance with these techniques, for a content item that is to be stored on behalf of a user, a device may examine a personal data set of the user to identify a personal context that describes a relevance of the content item to the user. For example, the device may examine recently exchanged messages, and/or other content that the user has viewed such as recent documents or other web pages, in order to evaluate and determine the relevance of the content item to the user's interest. The device may store a content item record of the content item and a personal context annotation of the personal context of the content item to the user.

The personal context annotation may then facilitate the presentation of the content item to the user. For example, the device may present the content item to the user by retrieving the personal context annotation of the personal context from the content item record, and presenting to the user, with the content item, the personal context annotation of the personal context of the content item. In this manner, the device may automatically identify and preserve the personal context of the content item as a description of its relevance to the user's interests, and may include a description of such personal interest to the user when the content item is later viewed and/or acted upon by the user, in accordance with the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenario

The following provides a discussion of some types of computing scenarios in which the disclosed subject matter may be utilized and/or implemented.

1.1. Networking

Figure 1:
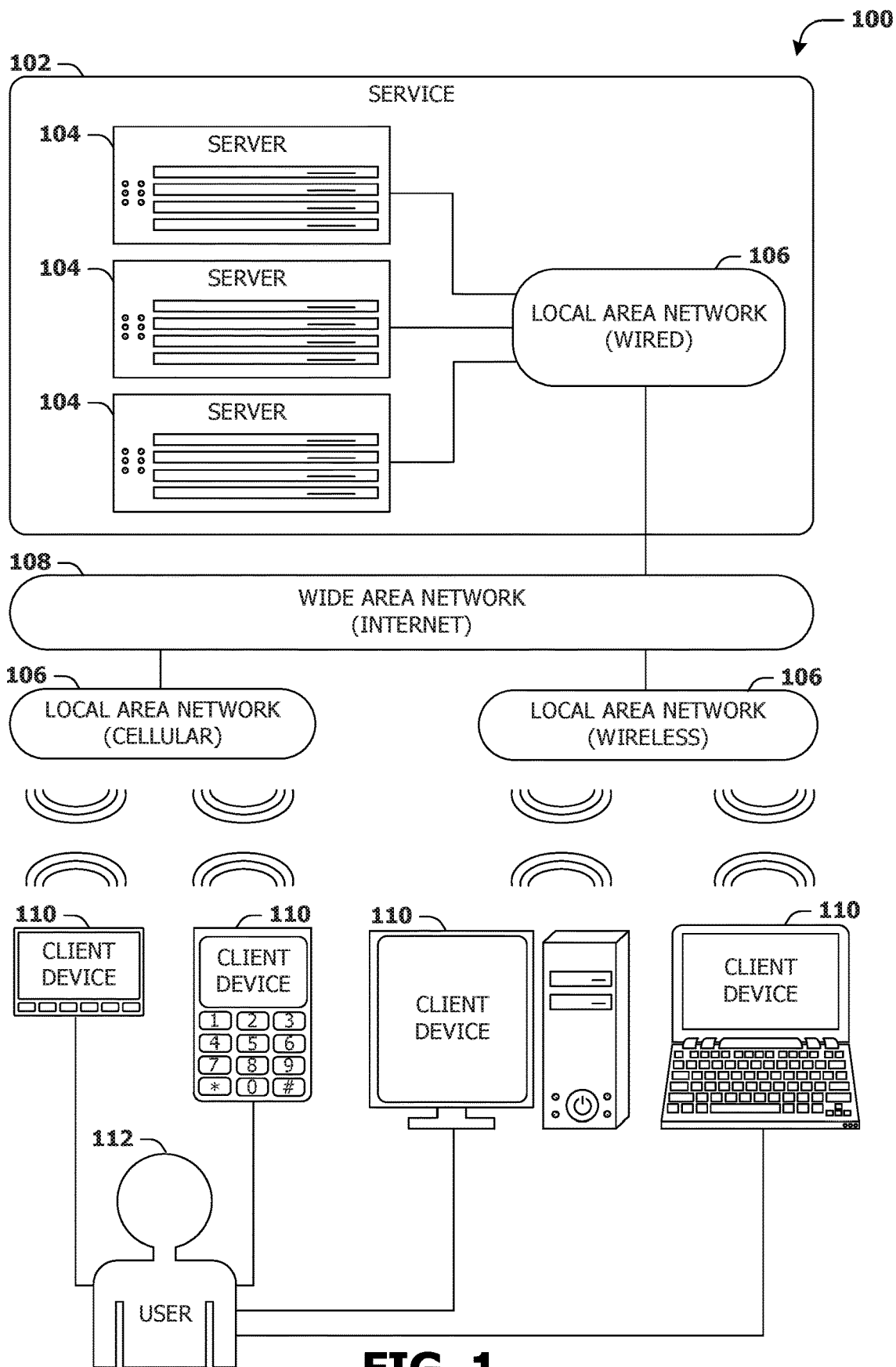
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, the local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and client devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of client devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective client devices 110 may communicate with the service 102 via various connections to the wide area network 108. As a first such example, one or more client devices 110 may comprise a cellular adapter 306, and may connect to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
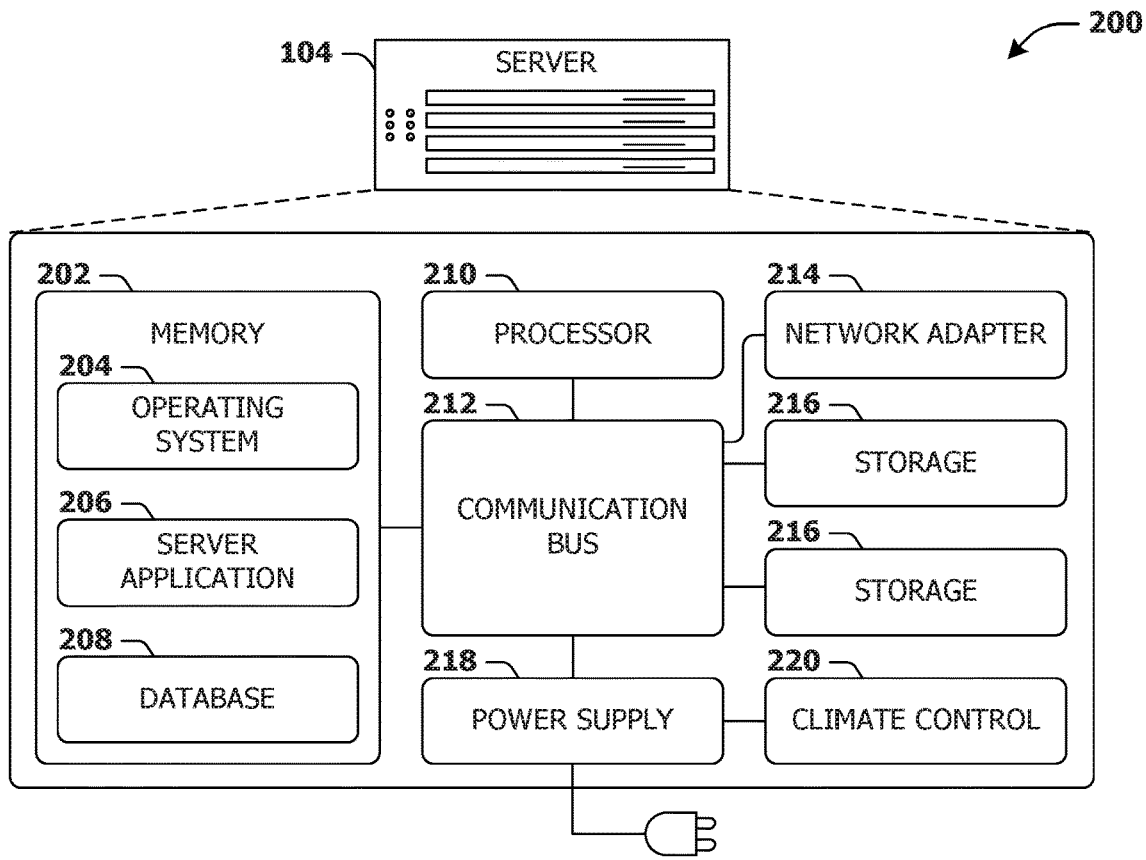
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectible to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, one or more communication buses 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Client Device Configuration

Figure 3:
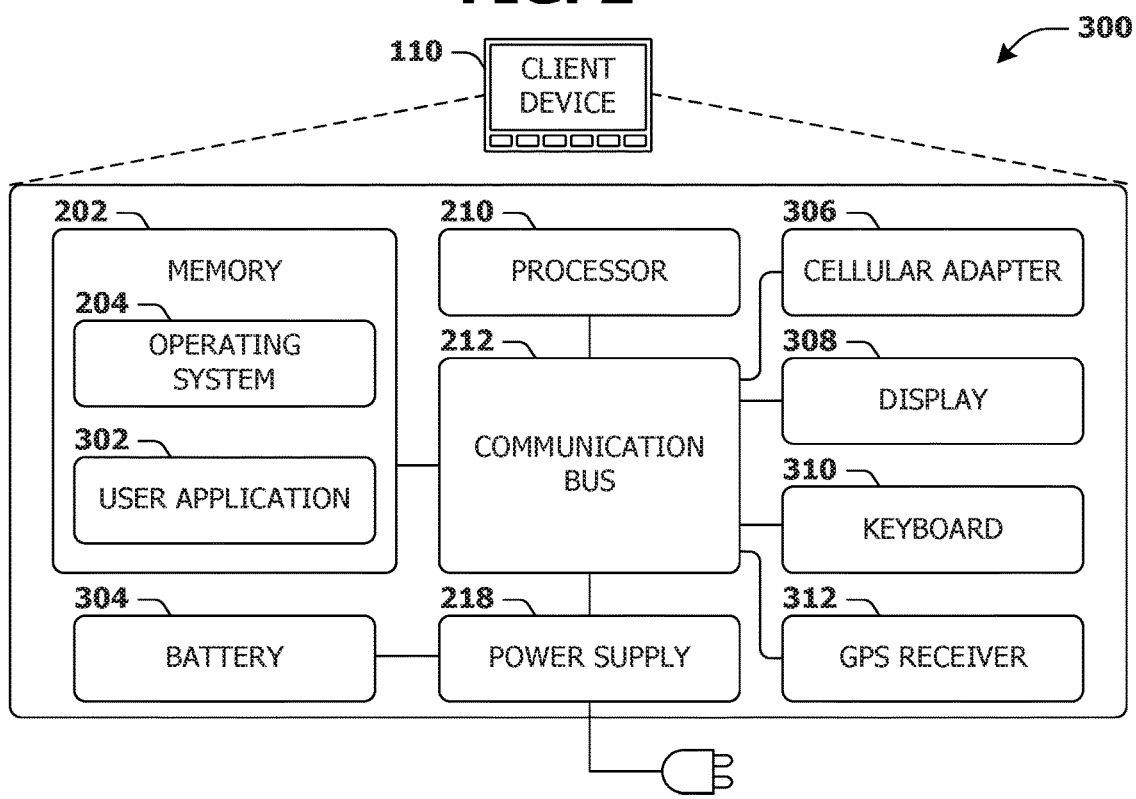
FIG. 3 is an illustration of a scenario involving an example configuration of a client that may utilize at least a portion of the techniques presented herein.

FIG. 3 presents a schematic architecture diagram 300 of a client device 110 operable by a user 112, whereupon at least a portion of the techniques presented herein may be implemented. Such client devices 110 may vary widely in configuration or capabilities, in order to provide a variety of functionality to the user 112. A client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A client device 110 may also serve the user 112 in a variety of roles, such as a workstation, kiosk, media player, gaming device, and/or appliance.

A client device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A client device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A client device 110 may also comprise a variety of peripheral components, such as a wired and/or wireless network adapter 214 connectible to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, and/or an compass, accelerometer, and/or gyroscope that detects a physical orientation of the client device 110. Other components that may optionally be included with the client device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

A client device 110 may comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A client device 110 may also comprise a dedicated and/or shared power supply 218 that supplies and regulates power for the other components, and/or a battery 304 that stores power for use while the client device 110 is not connected to a power source via the power supply 218. The client device 110 may also provide power to and/or receive power from other client devices 110.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may also include one or more servers that may locally serve the client device 110 and/or other client devices 110 of the user 112 and other individuals. For example, a locally installed webserver may provide web content in response to locally submitted web requests. Many such client devices 110 may be configured and/or adapted to utilize at least a portion of the techniques presented herein.

1.4. Content Item Presentation

Figure 4:
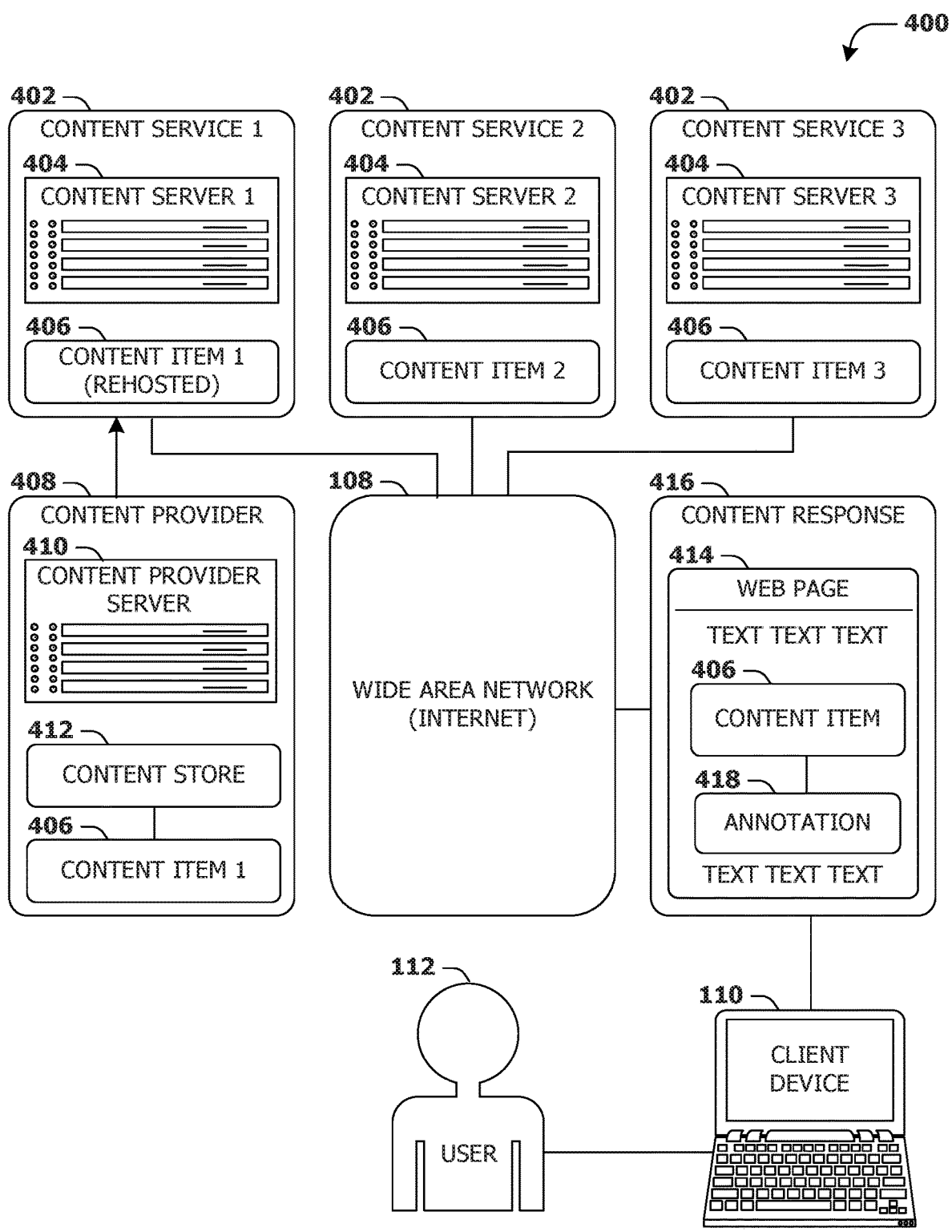
FIG. 4 is an illustration of a scenario involving a presentation of content items stored by a set of content services and transmitted to a client device for presentation to a user.

FIG. 4 is an interaction diagram of a scenario 400 featuring the delivery of content items to a client device for presentation to a user. In this scenario 400 of FIG. 4, a set of content services 402 respectively comprise a content server 404 that provides access to a set of content items 406, such as text articles, pictures, video, audio, applications, data files, and output from devices such as cameras. A content provider 408 is provided, comprising a content provider server 410 that interacts with the content services 402 over a wide area network 108, such as the Internet, to index the content items 406 provided thereby. For example, the content provider server 410 may utilize a content crawler that iteratively explores the content services 402 and generates a content store 412, e.g., a collection of the content items 406 or references thereto, and/or a content index that enables rapid identification of particular content items 406. The content provider 408 may be deployed in a distributed manner across at least two content provider servers 410, which may be organized by role (e.g., a first content provider server 410 hosting a content item 406, and a second content provider server 410 interacting with users 112 and/or client devices 110) and/or geographically (e.g., various content provider servers 410 may be provided to service client devices 110 in different physical locations). In some cases, a first content provider server 410 may rehost a content item 406 that originates from and/or serves as an original source of the content item 406. Components may be duplicated within the content provider 408; e.g., two or more content provider servers 410 may be provided to facilitate the reliability, response time, and/or scalability of the content provider 408.

As further illustrated in the scenario 400 of FIG. 4, a user 112 of a client device 110 may engage in an interaction with the content provider 408 and/or content services 402 in the following manner. For example, the client device 110 may present a request for a web page 414 provided by the content provider 408, such as a web page identified by a uniform resource location (URL). In response, the content provider 408 may transmit a content response 416 that includes a web page 414 comprising various sets of content, including a content item 406 to which an annotation 418 of information has been attached. The content item 406 may be selected by the content provider 408 from the content store 412, which may attach the annotation 418 based on a collection of information from public sources; e.g., if the content item 406 comprises a description of an event, the annotation 418 may comprise a map depicting the location of the event. In this manner, the client device 110 retrieves content items 406 in response to the request by the user 112, and thereby achieves the presentation of the content item 406 along with an annotation 418 of supplemental information as provided by the content provider 408.

1.5. Annotation of Content Item

Figure 5:
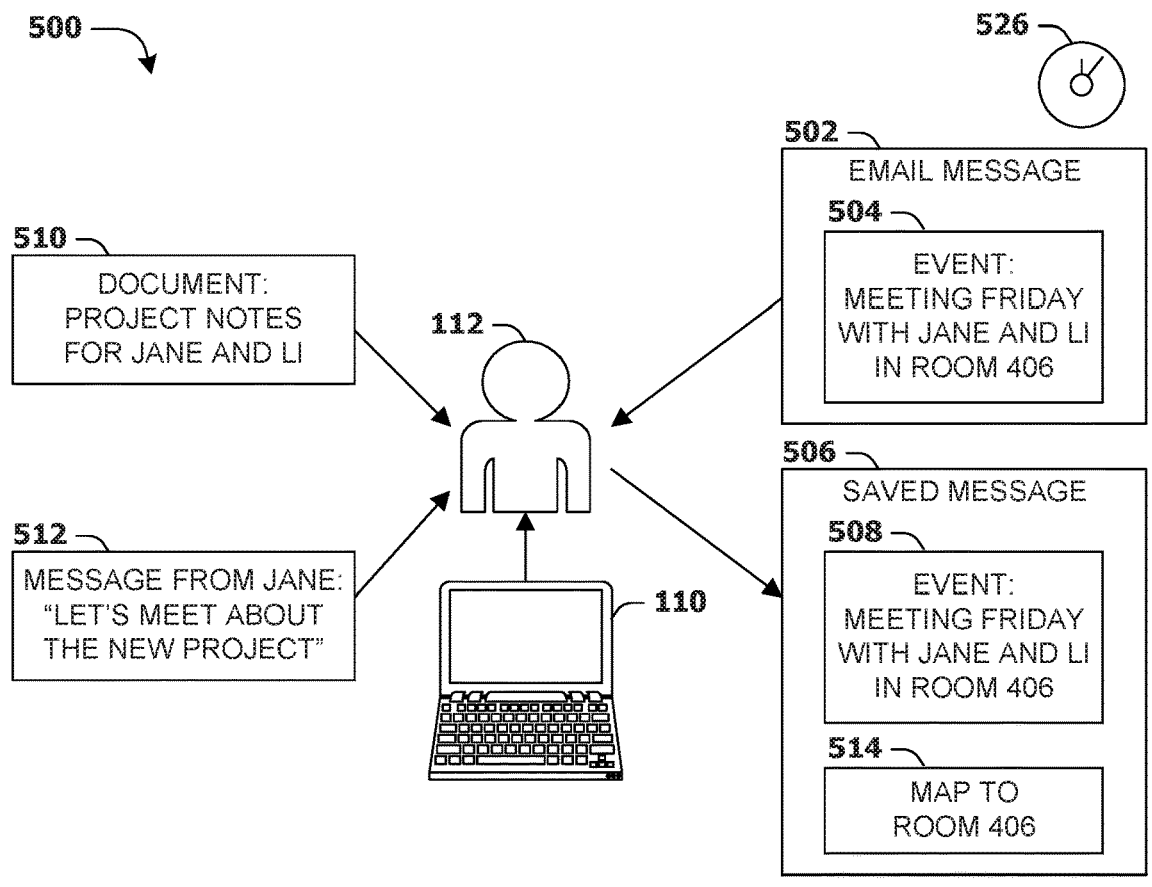
FIG. 5 is an illustration of a scenario involving the storage and presentation of a content item using a set of annotations.
Figure 5:
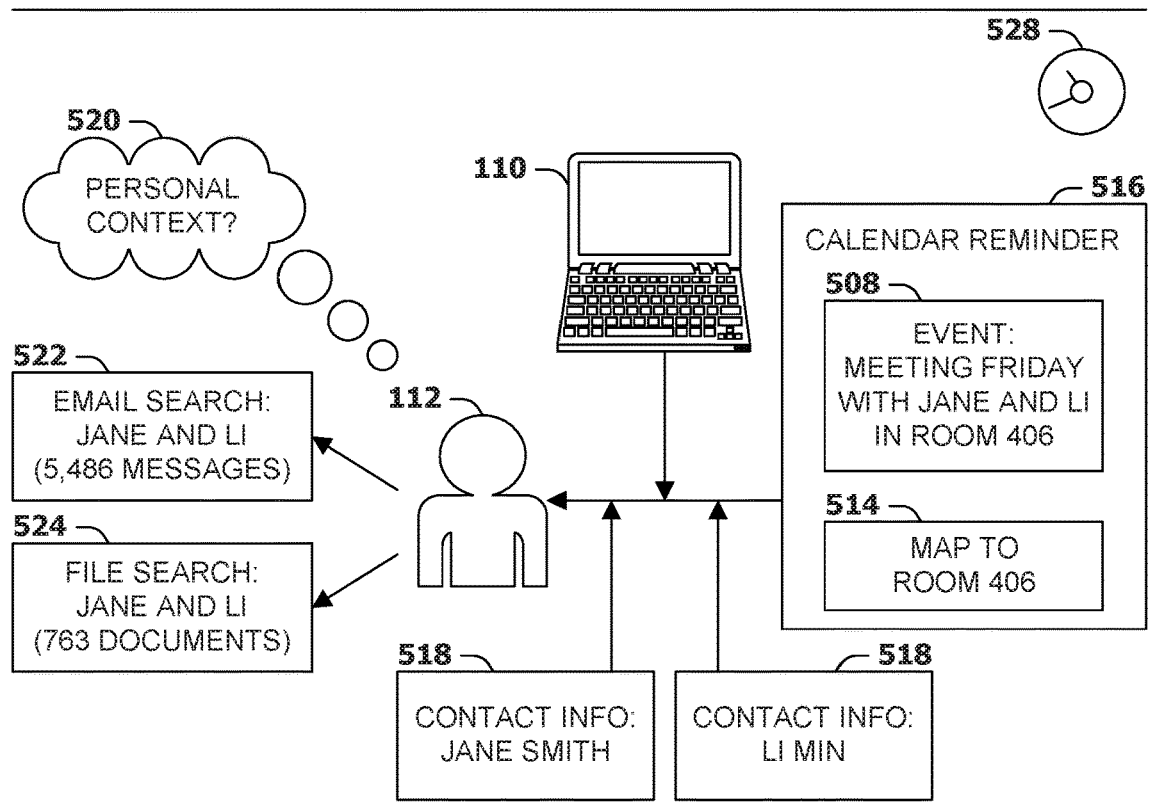

FIG. 5 is an illustration of a scenario 500 in which a content item is presented to a user 112. In the scenario 500 of FIG. 5, at a first time 526, a user 112 of a client device 110 receives an email message 502 containing a content item 406 such as an invitation to attend an event 504—specifically, a meeting at a specific location with two colleagues (Jane and Li). The user 112 requests to save the information, such as a request to flag the email message 502 as important, or to move the email message 502 to a specific folder. The user's request to save the email message 502 may prompt the client device 110 to handle it as a significant data item for the user 112 (rather than discarding the email message 502 as unsolicited or "spam" email). For example, the client device 110 may save the contact addresses for Jane and Li as the user's colleagues; may include the email message 502 in an index to facilitate later searching; and/or may update spam filters to whitelist the sender. The client device 110 of the user 112 may collect supplemental information from third-party sources to be stored with the email message 502, e.g., a map 516 of the location of the meeting. Additionally, the user 112 may be using the client device 110 to engage in other activities that contextually relate to the subject of the meeting comprising the event 504. As a first example, the user 112 may have sent or received, through the client device 110, one or more messages 512 (e.g., other email messages 502 apart from the email message 502 to which the invitation for the event 504 is attached, or text messages sent or received through a messaging service or network platform) that discuss organizing a meeting for the purpose of discussing a project, and a document 510 that the user 112 is editing on the client device 110 that relates to the project. While these actions may be performed on the client device 110, the only contextual association between these actions and the event 504 specified in the email message 502 exists in the mind of the user 112 at the first time 526.

At a second time 528, the client device 110 may present a calendar reminder 514 of the event 508 to the user 112. The calendar reminder 514 may be supplemented with additional information, such as the map 516 to the location of the event 508, and contact information 518 for the other individuals who are attending the event 508. However, the user 112, upon being presented the calendar reminder 514, may realize that the personal context 520 for the event 508 has been forgotten: Why was the user 112 attending the meeting? Which interests of the user 112, such as topics that the user 112 wished to discuss at the meeting, or particular individuals (among the set of attendees) whom the user 112 desired to meet, are involved in the meeting? What was the expected role of the user 112 at the meeting, and what was expected of the user 112 at the meeting? What information did the user 112 hope to have on hand to present at the meeting? Together, what was the personal context of the user 112 for the content item—i.e., what was the relevance of the event 508, as a content item 406, to the user? Such information about the user's personal context is not apparent from the content item 406 (e.g., the email message 502, the event 504) or the supplemental information that has been arbitrarily collected and appended to the content item 406, such as the map 516 and the contact information 518 of other attendees. In order to determine this personal context 520, the user 112 may have to reconstruct the background of the contact item 406, such as by performing an email search 522 for other email messages 502 involving the attendees (potentially involving a large number of exchanged messages) and/or a file search 524 for files that relate to the event 504 (e.g., trawling through documents that may reveal the relevance of the meeting to the user 112). Such reconstruction may be unsuccessful—such that the user 112 remains unaware of the relevance of the meeting to the user 112—and/or may be stressful (e.g., if the calendar reminder 514 is presented as an imminent reminder of the start of the meeting).

This pattern of events—where the user 112 chooses to store a content item 406 at a first time 526 due to a realization of personal context 520 that indicates why the content item is relevant to the user 112, yet where the user 112 has difficulty recalling the personal context 520 of the stored content item 406 when presented to the user 112 at a second time 528—may occur in a wide variety of domains.

As a first example, at a first time 526, a user 112 may view a content item 406 comprising a web page, and may realize a personal context 520 for the content item 406 (e.g., a realization that the content of the web page pertains to a project or interest of the user 112, or that the web page was written by and/or mentions an individual who has a social relationship to the user 112) that prompts the user 112 to save the web page, such as through a bookmark. However, at a second time 528, the user 112 may encounter the bookmark for the web page, but may have forgotten the personal context 520, and may have difficulty recalling any relevance of the web page to any interest of the user 112.

As a second example, at a first time 526, the user 112 browsing a social media site may encounter a photo of a location, and the experience may prompt an idea by the user 112 of some personal context 520 regarding the photo (e.g., a memory of having visited the same location in the past; a motivation to visit the same location in the future; or an interest in discussing the photo with the photographer). The user 112 may choose to save the photo (e.g., saving it locally in a file system, or adding it to a favorites list in the social media service) with the intent of acting on the personal context 520 at a later time. However, at a second time 528, the user 112 may encounter the content item 406, yet may have difficulty recalling the user's previous idea of the personal context and relevance of the photo to the user 112.

These examples illustrate a distinct failure of the client device 110, while storing the content item 406, to identify and preserve the personal context 520 that describes the relevance of the content item 406 to the user 112. In the example scenario 500 of FIG. 5, the client device 110 that receives the email message 502 describing the event 504 also has access to message 512 from Jane indicating the topic of the event 504 (i.e., the personal context 520 and relevance of the meeting to the user 112), as well as a document 510 describing the project that is to be discussed with the other attendees at the meeting. However, even if the user 112 performs actions that demonstrate a semantic relationship and interconnections of the collection of content items 406, the client device 110 only presents to the user 112 the content item 406 and impersonal data, such as the map 516 and the contact information 518, that do not describe the relevance of the event 504 to the user's interests. In the example of a web page, the metadata that is typically captured with the bookmark—e.g., the name, author, and publication date of the content of the web page—fails to describe the personal context 520 the web page, i.e., why the web page is relevant to any interest of the user 112. The client device 110 may have had access to a variety of such information, including the apparent intent of the user 112 from the sequence of web navigation including the web page, or actions taken by the user 112 involving the web page—but may neither reach, preserve, nor present to the user the personal context 520 that describes the relevance of the web page to the user 112. In the example of a photo saved from a social media site, the metadata that is typically captured with the photo—e.g., the EXIF data describing the resolution, color depth, date and time of the photo, geocoordinate, and camera model—may fail to describe the relevance that motivated the user 112 to save the photo. The client device 110 may have been capable of inferring the personal context 520, such as by determining that the photographer is also a social network connection of the user 112 (i.e., not just that the photo was taken by a particular individual, but that the photographer has a specific relationship with the user 112), or that the user 112 has previously visited the location matching the geocoordinate, but may fail to present such inferences as the personal context 520 of the photo to the user 112. These failures demonstrate the incapacity of conventional client devices 110 to deduce, preserve, and present to the user 112 the personal context 520 describing the relevance of the content item 406 to the user 112.

2. Presented Techniques

Figure 6:
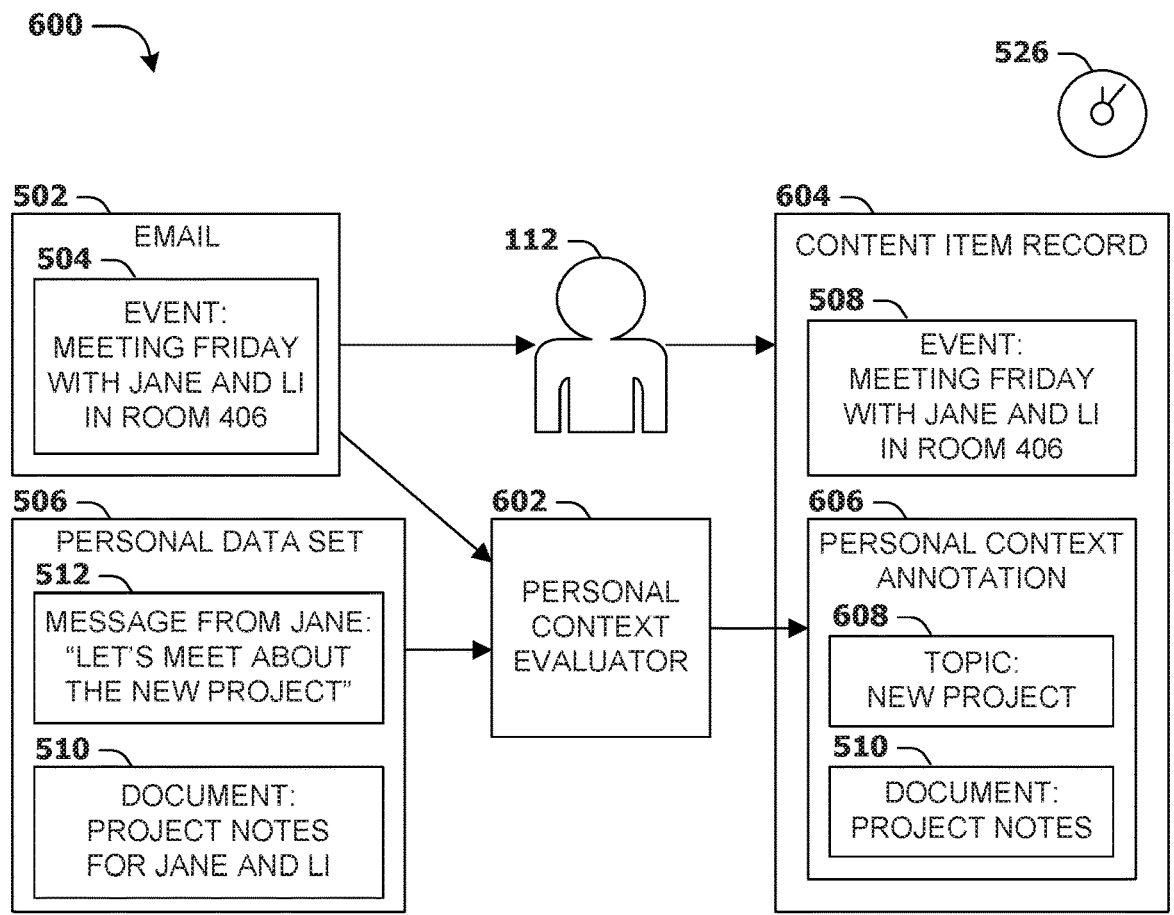
FIG. 6 is an illustration of a scenario involving the storage and presentation of a content item using a set of personal context annotations, in accordance with the techniques presented herein.
Figure 6:
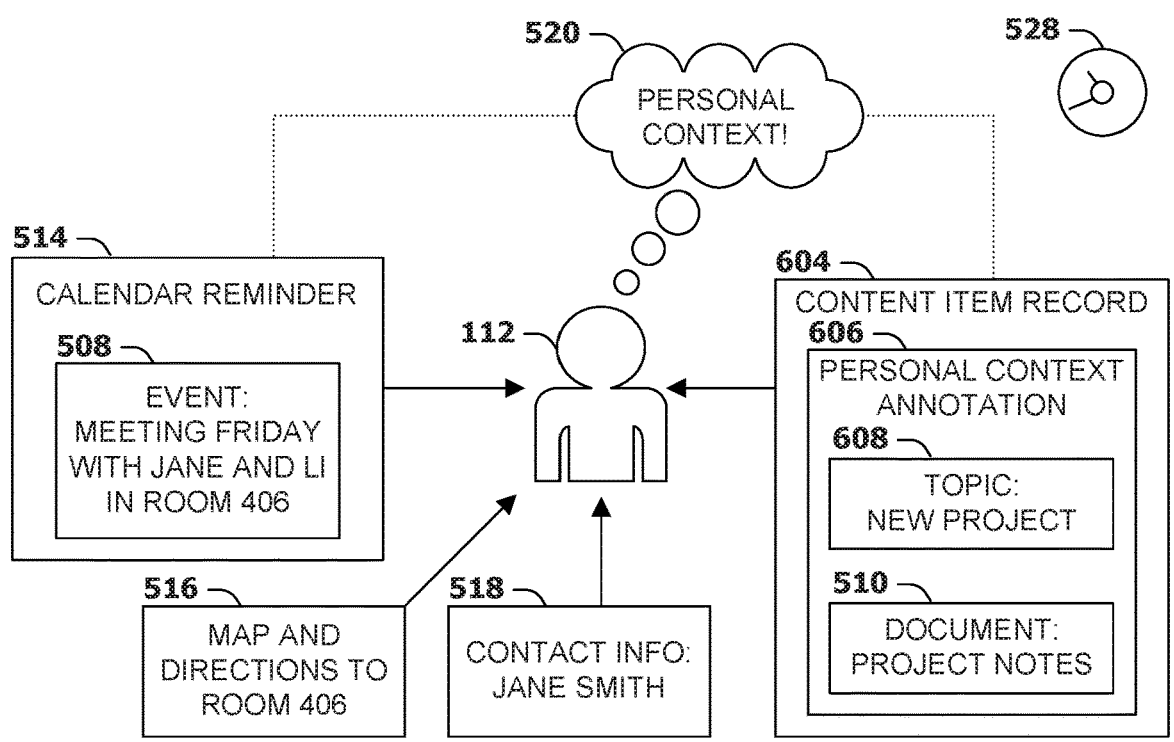

FIG. 6 is an illustration of a scenario 600 involving alternative techniques for presenting a content item 406 to a user 112 in accordance with the techniques presented herein.

In the example scenario 600 of FIG. 6, at a first time 526, the user 112 again receives an email message 502 for an event 504 such as a meeting, which the user 112 chooses to save. In carrying out the storage of the content item 406 comprising the email message 502, the client device 110 may utilize a personal context evaluator 602 that endeavors to determine the personal context 520 of the content item 406, i.e., the relevance of the content item 406 to the user 112. The personal context evaluator 602 may utilize a personal data set 506 of the user 112 to determine the personal context 520 of the meeting to the user 112, such as the user's set of messages, documents, and social network relationships. As a first example, the personal context evaluator 602 may identify a message 512 (e.g., a text message or separate email message 502) between the user 112 and one of the individuals identified in the email message 502 as a meeting attendee, and which both proposes a meeting (apparently the event mentioned in the email message 502) as well as the purpose of the meeting (i.e., to discuss a particular project). As a second example, the personal context evaluator 602 may identify a document 510 prepared and/or accessed by the individual that relates to the project to be discussed at the meeting, and that names the other individuals who are attending the meeting. The personal context evaluator 602 may determine that these items from the personal data set 506 of the user 112 reveal the personal context 520 of the content item 406 (i.e., the email message 502 and the event 504 described therein). The personal context evaluator 602 may therefore create a content item record 604 for the content item 406 (e.g., an entry on the user's calendar), and may annotate the content item record 604 by including one or more personal context annotations 606 that describe the personal context 520 of the content item 406—i.e., the relevance of the content item 406 to the interests of the user 112.

At a second time 528, the client device 110 may present the content item record 604, including the personal context annotations 606, to the user 112. For example, prior to the start of the meeting, the client device 110 may present to the user 112 a meeting reminder, which may include some supplemental information gathered from outside (i.e., impersonal) data sources, such as a map 516 of the location of the meeting and/or contact information 518 for the other attendees of the meeting. However, the client device 110 also presents the personal context annotations 606 that the personal context evaluator 602 stored in the content item record 604—e.g., a description of the topic 608 of the meeting (as described in the message 512 from another attendee) and/or a document 510 relating to the topic (e.g., the project notes document 510 discovered by the personal context evaluator 602). This information may be presented to the user 112 alongside the content item record 604 to reveal the personal context 520 of the content item 406 to the user 112, who may have forgotten the topic 608 of the meeting, and/or who may have difficulty locating the project notes document 510 in the user's file system. In this manner, the client device 110 may preserve the personal context 520 of the content item 406 for presentation to the user 112 in accordance with the techniques presented herein.

3. Technical Effect

The techniques presented herein and illustrated in the scenario 600 of FIG. 6 may provide a variety of technical effects for the presentation of content items 406 to a user 112.

As a first technical effect, the preservation of personal context 520 of a stored content item 406 may enable a timely presentation of relevant information to the user 112, such as supplementing the presentation of a calendar reminder 514 that is supplemented with a description of the topic 608 of the meeting that relates to the user's interests, and appending a document 510 that relates to the topic 608 to be discussed at the meeting. The automatic discovery may therefore enable the compilation of the content item record 604 that collects a set of information from the personal data set 506 that comprises, describes, clarifies, and/or supplements the personal context 520 of the content item 406.

As a second technical effect, the currently presented techniques enable an automatic inference of personal context 520, rather than soliciting the user 112 to specify this information. For example, many devices allow a user to drive the process of annotating a content item with information that indicates its personal context 520. For example, in conventional circumstances, a user 112 may organize saved bookmarks for various websites in folders or locations that denote their relevance to the user 112, and/or may annotate the bookmark for a website with a description in a memo field of the user's interest in the content item 406. Similarly, a user 112 may accept an invitation for an event 508 (as a content item record 604 for the content item 406), and also attach notes or files as a personal context annotation 606 that later serves as a reminder to the user 112 of the relevance of the content item 406 to the user's interests. However, these aspects require the user 112 to drive the annotation, which may be distracting or frustrating for the user 112, and/or may fail if the user 112 forgets to perform the annotation, thus resulting in a later presentation of the content item 406 without annotations that indicate its personal context 520 for the user 112. Moreover, in some circumstances, the user 112 may not be aware of the personal context 520 even at the first time 526 when the content item 406 first arrives; e.g., the user 112 may accept an invitation to attend an event 508 (such as a meeting request from a colleague) without realizing, even initially, the relevance of the event 508 to the user 112. The currently presented techniques enable an automatic discovery of the personal context 520 and the attachment of the personal context annotation 606 to the content item 406, thereby alleviating the user 112 from the obligation to specify, remember, and/or even initially understand the personal context 520 of the content item 406.

As a third technical effect, in addition to enabling a presentation of the personal context annotations 606 with the content item, the attachment of personal context annotations 606 to content item records 604 for content items 406 may facilitate other processes of a device and computing environment. For example, the generation and/or clustering of personal context annotations 606 for a variety of content items 406 may facilitate searching, e.g., by providing a set of semantic interconnections of topics and interests that are relevant to the user 112. For example, in the scenario 600 of FIG. 6, the user 112 receives an invitation for a meeting, where the invitation does not specify the topic 608 of the meeting. By automatically discovering the topic 608 of the meeting (i.e., the new project) and attaching it to the content item record 604 as a personal context annotation 606, the device may later fulfill a query such as "when am I discussing the project with Jane and Li?" by determining that the personal context annotation 606 for "new project" is attached to the content item record 604 for the meeting event 508. Without such personal context annotation 606 (e.g., in the scenario 500 of FIG. 5), the device may have a record of the event 508, but may not have determined that it is contextually associated with the new project, nor that the new project is of interest to the user 112, so the query from the user 112 might fail or present incorrect results (e.g., indicating that no such meeting exists, or presenting a search result related to a different project). The techniques presented herein may therefore be utilized to facilitate searching to provide the content item 406 that the user 112 is seeking, and may provide results that the user 112 requested even if the search query does not directly describe the content item 406 (e.g., in response to a query such as "project," presenting an email message and/or meeting invitation for a meeting that happens to involve a project, even if neither the email message nor the meeting invitation actually includes the term "project"). Many such technical effects may arise from the annotation of content items 406 with personal context annotations 606 that describe the relevance of the content item 406 to the user 112, in accordance with the techniques presented herein.

4. Example Embodiments

Figure 7:
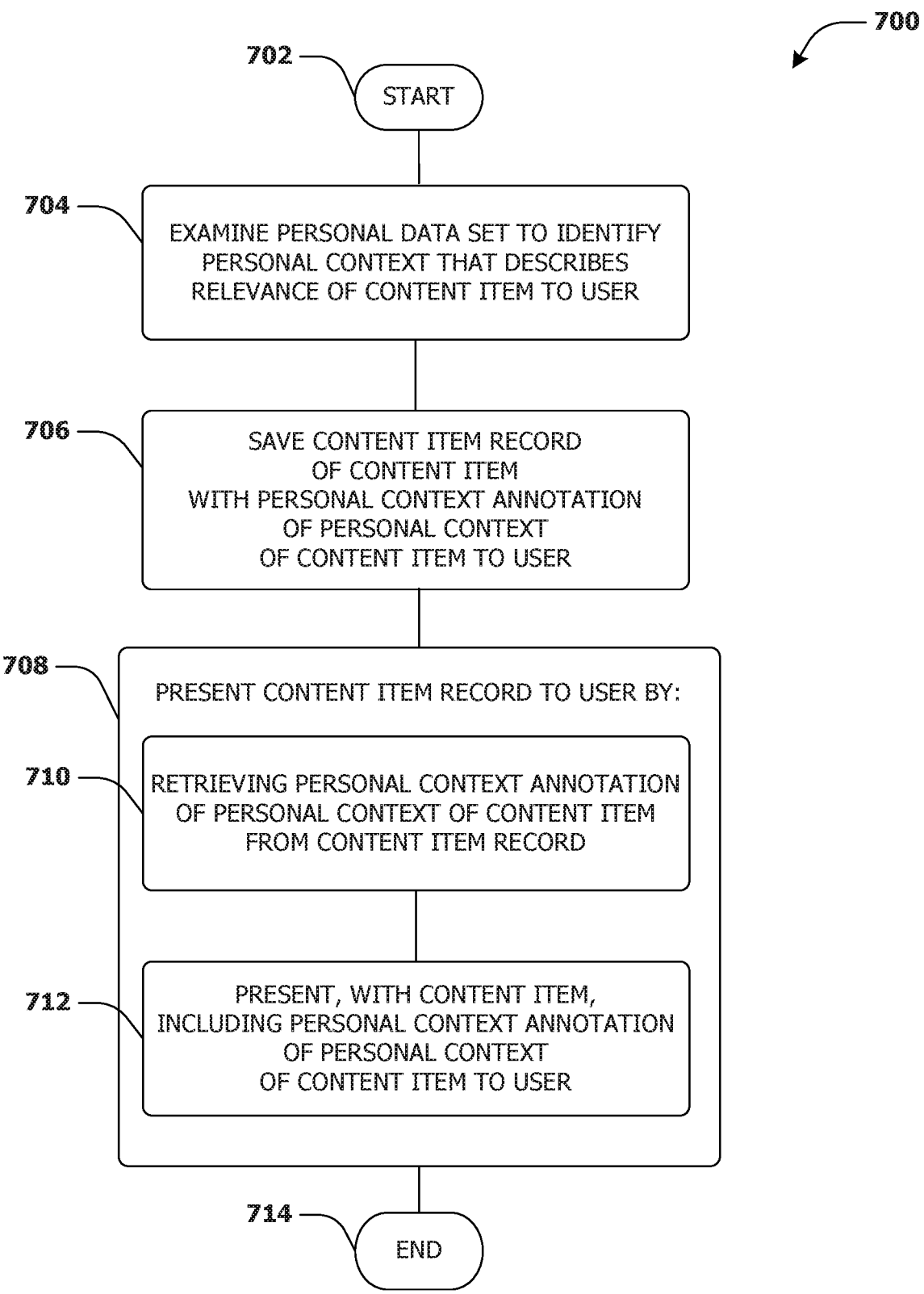
FIG. 7 is an illustration of a scenario featuring an example method of presenting a content item annotated with personal context in accordance with the techniques presented herein.

FIG. 7 presents an illustration of a first example embodiment of the techniques presented herein, illustrated as an example method 700 of presenting content items to a user 112. The example method 700 may be implemented, e.g., as instructions stored in a memory (e.g., a hard disk drive, a solid-state storage device such as a flash memory device, or a magnetic or optical disc) that, when executed on a processor of a client device 110, cause the client device 110 to operate according to at least a portion of the techniques presented herein.

The example method 700 begins at 702 and involves examining 704 a personal data set 506 of the user 112 to identify a personal context 520 that describes a relevance of the content item 406 to the user 112. The example method 700 also involves storing 706 a content item record 604 of the content item 406, and a personal context annotation 606 of the personal context 520 of the content item 406 to the user 112. The example method 700 also involves presenting 708 the content item 406 to the user 112 by retrieving 710 the personal context annotation 606 of the personal context 520 from the content item record 604, and presenting 712 to the user 112, with the content item 406, the personal context annotation 606 of the personal context 520 of the content item 406. Having achieved the presentation of the content item 406 to the user 112 in accordance with the techniques presented herein, the example method 700 ends at 714.

Figure 8:
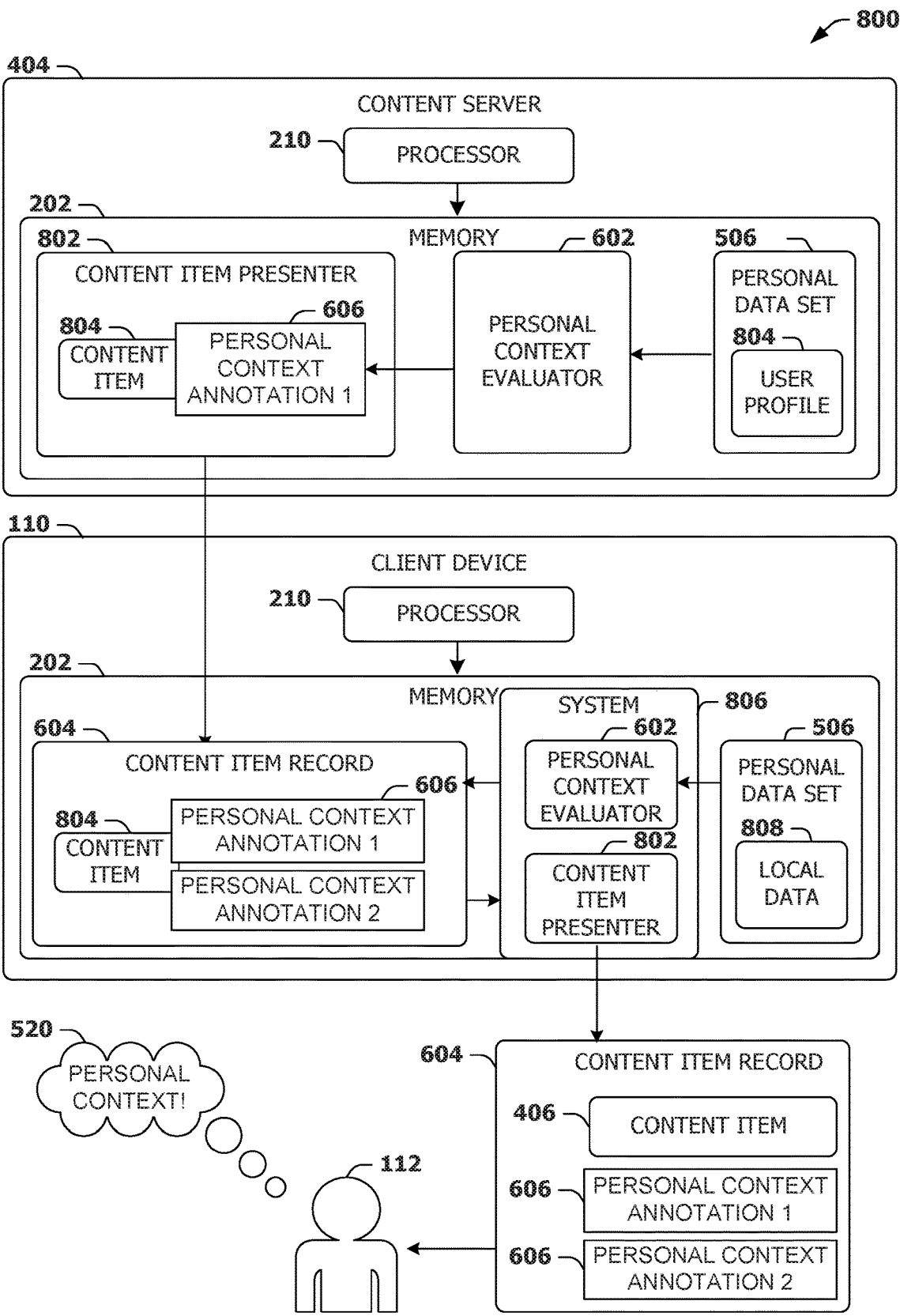
FIG. 8 is an illustration of a scenario featuring an example server and example client device that coordinate to present content items annotated with personal context in accordance with the techniques presented herein.

FIG. 8 presents an illustration of a scenario 800 involving another example embodiment of the techniques presented herein, including a content server 404 that coordinates with a client device 110 to present content items to a user 112 in accordance with the techniques presented herein. The content server 404 and/or client device 110 may comprise a processor 210, and a memory 202 (e.g., a hard disk drive, a solid-state storage device such as a flash memory device, or a magnetic or optical disc) storing instructions that provide the components of an example system that causes the content server 404 and/or client device 110 to operate according to the techniques presented herein.

In this example scenario 800, a personal context evaluator 602 may annotate a content item 804 to be presented to the user 112. This example scenario 800 presents two example embodiments of the personal context evaluator 602: a first personal context evaluator 602 that operates on a content server 404, such as a host of content items 804 to be presented to the user 112, and a client device 110 of the user 112. As a first such example, the content server 404 executes instructions on the processor 210 that utilize the contents of various components stored in the memory 202 in the following manner. The content server 404 identifies a content item 804 that the user 112 wishes to save, and the personal context evaluator 602 of the content server 404 examines a personal data set 506 for the user 112, such as a user profile stored by a service provided by the content server 404 to the user 112, to identify a personal context 520 that describes a relevance of the content item to the user 112. The personal context evaluator 602 then stores and/or generates a first personal context annotation 606, which a content item presenter 802 attaches to a content item record 604 of the content item 406. The content item presenter 802 then sends the content item record 604 including the first personal context annotation 606 to the client device 110 for presentation to the user. The client device also executes instructions on the processor 210 that utilize the contents of various components stored in the memory 202 in the following manner. The client device 110 receives the content item record 604 comprising the content item 804 and the first personal context annotation 606, and then invokes a system 806 comprising a personal context evaluator 602 that evaluates a personal data set 506 of the user 112 (e.g., local data 812) to identify a personal context 520 that describes a relevance of the content item to the user 112, and to attach to the content item record 604 a second personal context annotation 606 of the content item 406. The system 806 of the client device 110 also invokes a content item presenter 802 that presents the content item 406, including both the first personal context annotation 606 generated by the content server 404 and the second personal context annotation 606 generated by the client device 110, in order to apprise the user 112 of both the content item 406 and the personal context 520 of the content item 406, in accordance with the techniques presented herein.

It is to be appreciated that the example scenario 800 of FIG. 8 illustrates a variety of possible embodiments of the techniques presented herein. As a first example, the techniques presented herein may be implemented as a content server 404 that serves content items 406 to a client device 110 for presentation to the user 112, wherein the content server 404 comprises the personal content evaluator 602 and the content item presenter 802. As a second example, the techniques presented herein may be implemented as a system existing and/or executing within the content server 404, such as the combination of a personal context evaluator 602 (e.g., as instructions stored in the memory 202) and/or the content item presenter 802. As a third example, the techniques presented herein may be implemented as a client device 110 that presents content items 406 received from the content server 404 to the user 112, wherein the client device 110 comprises the personal content evaluator 602 and the content item presenter 802. As a fourth example, the techniques presented herein may be implemented as a system existing and/or executing within client device 110, such as the combination of a personal context evaluator 602 (e.g., as instructions stored in the memory 202) and/or the content item presenter 802. It is to be appreciated that many such architectures may be used to implement the techniques presented herein.

Figure 9:
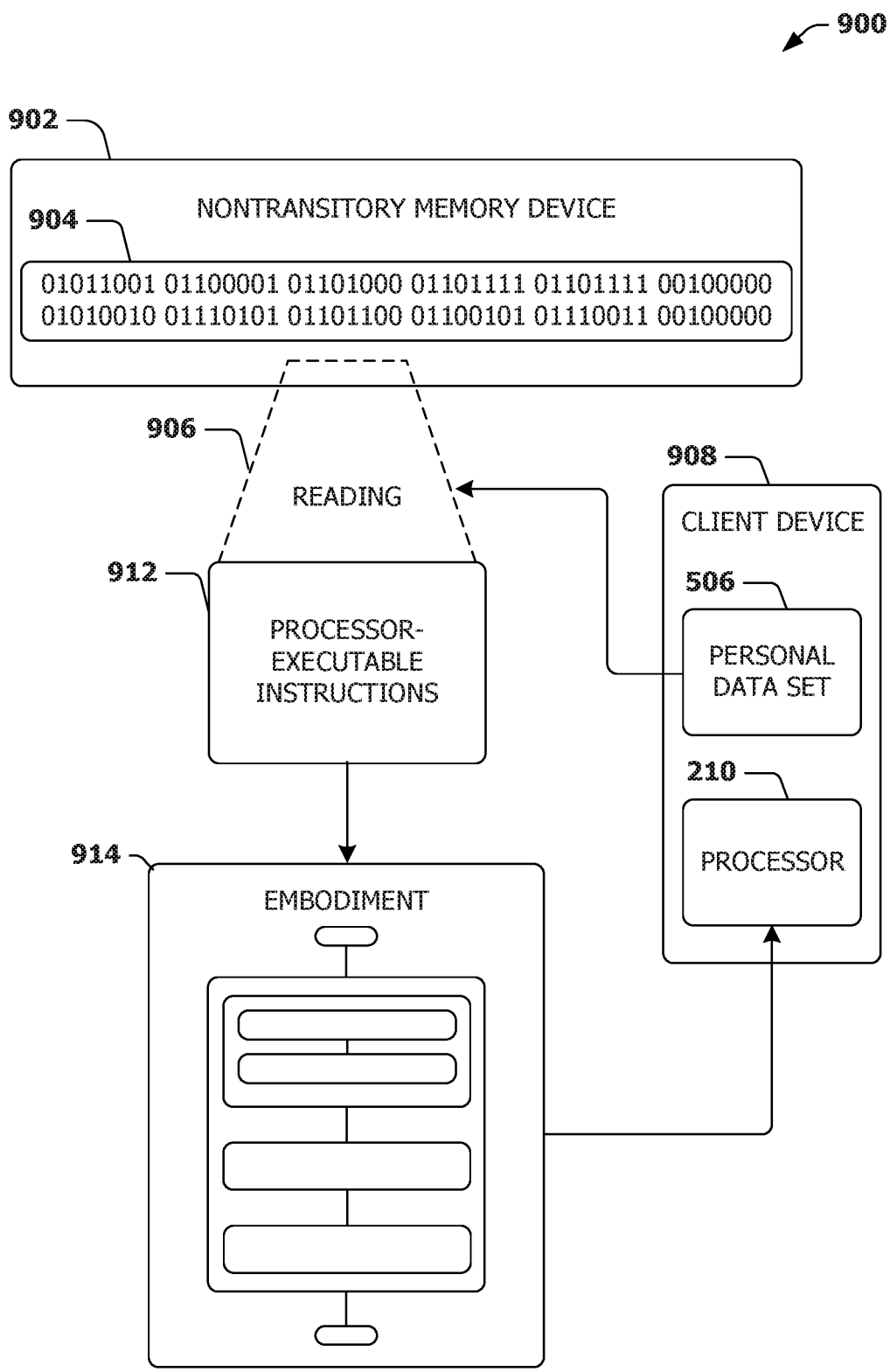
FIG. 9 is an illustration of a scenario featuring an example nontransitory memory device that causes a device to present content items annotated with personal context, for presentation to a user in accordance with the techniques presented herein.

FIG. 9 is an illustration of a scenario 900 involving a third example embodiment of the techniques presented herein, comprising an example nontransitory memory device 902, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. The processor-executable instructions 912, when executed on a processor 210 of the device 908, cause the device 908 to present content items 804 to a user 112, in accordance with the techniques presented herein. In another example, the computer-executable instructions may implement one or more components of a system, such as the first example system XXX of FIG. 8 and the second example system XXX of FIG. 8, such that when the instructions are executed on a processor of a client device 110 and/or content server 404, implement the systems that cause such devices to operate in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 700 of FIG. 7; the example devices and systems of FIG. 8; and the example nontransitory memory device 902 of FIG. 9) to confer individual and/or synergistic advantages upon such embodiments.

5.1. Scenarios

The techniques presented herein may be utilized in a variety of scenarios.

As a first such example, the techniques presented herein may be utilized with a variety of client devices 110, such as workstations, laptop and palmtop computers, mobile phones, tablets, game consoles, media players, appliances, wearable devices, and vehicle control systems. Such client devices 110 may also be owned and/or administrated by the user 112, or may only be in temporary use by the user 112, such as a public display device that presents content to the user 112. The client device 110 may also comprise a collection of such client devices 110, such as a device "mesh" of devices that the user 112 utilizes together, including a wristwatch, a mobile phone, and a tablet.

As a second such example, the techniques presented herein may be utilized with various types of content items 406, such as text, images, videos, audio, data sets, and applications. Such content items 406 may also comprise a container for such content, such as an email message, text or image message, a voicemail message, a web page, a document, an image and/or an annotation of an image in a social media network, and a comment in a social media network. Such content items 406 may also present various types of content, such as entertainment, news or informational material, educational or training content, and data or reference materials. Such content items 406 may also be personal to the user 112, such as a user's personal photo library, or may be distributed publicly, such as images selected from a publicly accessible image library. The techniques presented herein may also be provided by a variety of content services 402, such as freely available content services (e.g., a public library); proprietary, subscription-based content services (e.g., a subscription media library); and private content services (e.g., content provided exclusively for the user 112).

As a third such example, the techniques presented herein may insert content items 406 in a variety of circumstances, such as content embedded in web pages; static or dynamic documents; encapsulating media objects, such images, videos, and sound recordings; and applications and user interfaces, such as game applications. These and other scenarios may enable a suitable application of the techniques presented herein.

5.2. Receiving Content Item

A second aspect that may vary among embodiments of the techniques presented herein involves the selection of a particular content item 406 to which the techniques presented herein are to be applied.

As a first example of this second aspect, the techniques presented herein may be applied upon the receipt of a content item 406, such as a newly arriving email message, text message, or voicemail message. Such discovery may occur through the browsing and/or searching of the user 112, e.g., a request by a user 112 to receive a web page. As a second example of this second aspect, the techniques presented herein may be applied to newly generated content items 406, such as an event invitation created by the user 112 (e.g., where the user 112 has forgotten to specify a subject of a meeting, but where such personal context 520 is discoverable by examining the personal data set 506 of the user 112). As a third example of this second aspect, the techniques presented herein may be applied upon request of the user 112 to save a content item 406, such as a bookmarking of a web page, a "favorite" designation of an image in a media library such as a social media site, or a flagging of an email message or text message as a significant content item 406 to be saved. As a fourth example of this second aspect, the user 112 may specifically designate a portion of content to be saved as a content item 406, such as a portion of a website. For instance, a client device 110 may receive, from the user 112, a selection of the content item 406 as an element of a document (e.g., an element of a web page, such as an embedded text word, sentence, paragraph, comment, image, or URL), which may be stored and evaluated as the content item 406 to determine and preserve personal context in accordance with the techniques presented herein. Alternatively, the device 110 may receive, from the user 112, a selection of a region of a document, such as a rectangular or circular portion of a website, and may identify, within the region of the document selected by the user 112, one or more content items 406 to be stored, as well as evaluated to determine and preserve personal context in accordance with the techniques presented herein.

As a fifth example of this second aspect, a client device 110 may apply the techniques selectively to the evaluation of content items 406. A client device 110 may store personal context annotations 606 by first estimating a significance of the content item 406 to the user relative to a significance threshold, and storing the content item record 604 with personal context annotations 606 only after determining that the significance of the content item 406 exceeds the significance threshold. That is, rather than applying contextual evaluation to all content items 406 that are received and/or encountered, a client device 110 may apply the techniques selectively to items that are deemed to be significant. For example, the device 110 may refrain from evaluating and annotating ordinary text messages between the user 112 and other individuals that comprise routine conversation, as such annotations may be uninteresting and/or distracting to the user 112, and may represent clutter within the computing environment. Rather, the device 110 may apply the techniques to significant content items 406, such as web pages that a user chooses to bookmark, images that a user chooses to identify as "favorites," communication with individuals with whom the user 112 has a more significant relationship (such as the user's professional supervisor), and events that the user 112 chooses to attend. Such selective application of the techniques presented herein may conserve the computing resources of the device and avoid saturating the user 112 with contextual information beyond a helpful threshold. Many such techniques may be utilized to determine the content items 406 to which the presented techniques are applied.

5.3. Identifying Personal Context of Content Items

A third aspect that may vary among embodiments of the techniques presented herein involves the determination of the personal context 520 of the content items 406, i.e., the relevance of the content items 406 to the interests of the user 112.

Figure 10:
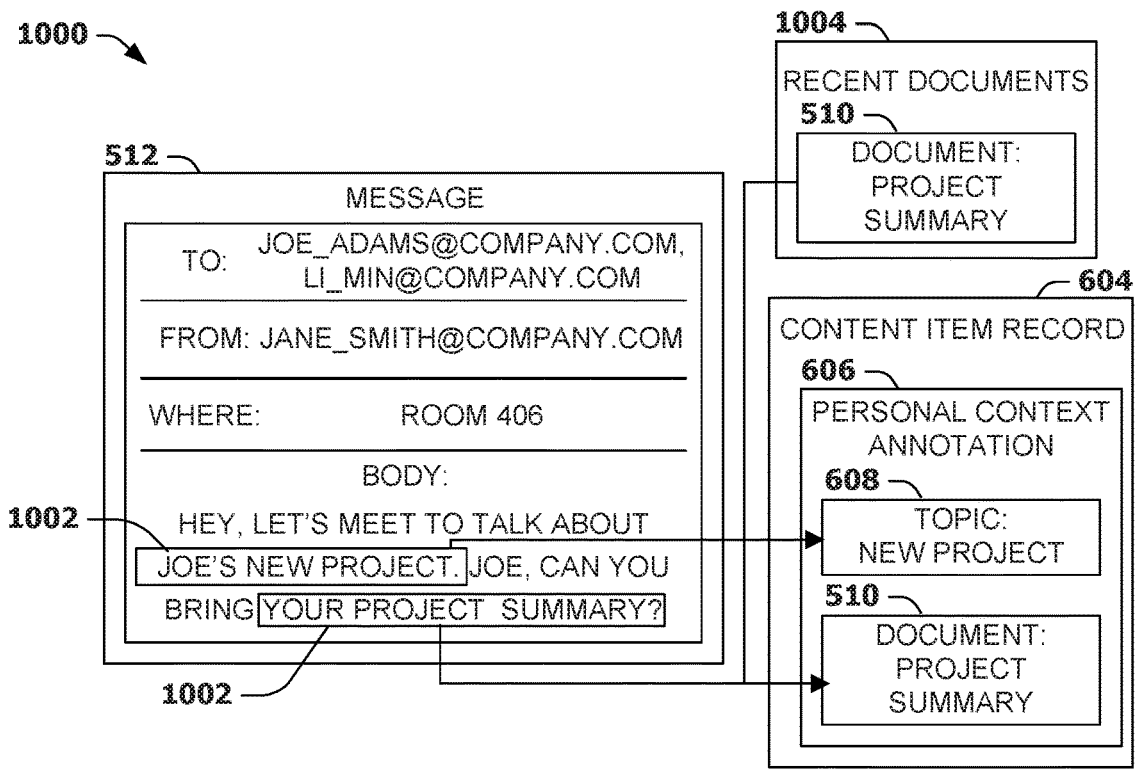
FIG. 10 is an illustration of a scenario featuring an identification of personal context and an annotation of a content item with the personal context in accordance with the techniques presented herein.

As a first example of this third aspect, the personal context 520 of a content item 406 may be determined by examining a content body of the content item to identify, in the content body, a description of the relevance of the content item to the user 112, and identifying the description of the relevance as the personal context 520 of the content item 406. For example, in the example scenario 1000 of FIG. 10, an email message 512 may include an event invitation, and a body of the email message 512 may also include several indicators 1102 of the personal context 520 that describes the relevance of the meeting to the user 112. A semantic analysis of the body of the email message 512 may enable the identification of the personal context 520 and the attachment of personal context annotations 606 to the event invitation (where such details are not already included in the event invitation), such as an indication of the topic of the meeting, and an automatic attachment of a document 510 that the user 112 was requested to bring to the meeting.

As a second example of this third aspect, the personal context 520 of a content item 406 may be determined by determining a set of aspects involving the content item 406, comparing the set of aspects with a set of interests identified in the personal data set 506 of the user 112 to identify a selected interest that matches a selected aspect, and identifying the selected interest as the personal context 520, i.e., the relevance of the content item to the user 112. For example, a user 112 may request to save a content item 406 such as an invitation from an individual to attend a movie. However, it may not be clear from the interaction whether the user 112 is interested in the content of the movie (e.g., whether the user wants to see the movie for its story or subject matter); whether the user 112 is interested in the cast of the movie (e.g., whether the user wants to see movies featuring a certain actor or actress); or whether the user 112 is not interested in the movie, but still wants to attend as a social interaction with other attendees of the movie. A comparison of the personal data set 506 of the user 112 may indicate the user's interests (e.g., whether the user enjoys films in the same genre as the movie; whether the user often sees movies featuring a particular actor or actress; and/or whether the user has expressed interest in another attendee of the event), and may attach personal context annotations 606 that relate some aspect of the event, as a content item 406, to the interests of the user 112.

As a third example of this third aspect, the personal context 520 of a content item 406 may be determined by monitoring an action of the user 112 involving the content item responsive to a first presentation of the content item 406, and inferring, from the action of the user 112, the personal context that describes the relevance of the content item 406 to the user 112. As a first example, if the user receives a content item 406 comprising an event invitation to view a movie, the user 112 may respond by viewing a trailer for the movie, and then indicating that the user 112 intends to attend the viewing. From this sequence of actions, the client device 110 may infer that the user 112 is interested in seeing the movie due to its content. As a second example, if the user receives a content item 406 comprising an event invitation to view a movie, the user 112 may respond by viewing the list of other attendees for the movie, and then indicating that the user 112 intends to attend the viewing. From this sequence of actions, the client device 110 may infer that the user 112 is interested in seeing the movie because of the other people who are also attending. Additionally, a client device 110 may respond to the inference of the personal context 520 by recording the inference of the relevance to the user 112 of content items 406 that are similar to the content item 406 (e.g., noting that the user 112 is interested in seeing movies of a certain type, or is interested in attending events that a particular individual is attending), and may subsequently identify the personal context 520 of a second content item 406 by determining that the second content item 406 is similar to the forts content item 406, and according to the inference of the relevance to the user 112 of content items 406 that are similar to the first content item 406. Many such techniques may be utilized to determine the personal context 520 of the content item 406 to the user 112 in accordance with the techniques presented herein.

5.4. Storing and Preserving Personal Context of Content Items

A fourth aspect that may vary among embodiments of the techniques presented herein involves the storing of a personal context annotation 606 of the personal context 520 of the content items 406 in the content item record 604 to indicate the relevance of the content items 406 to the user 112.

As a first example of this fourth aspect, storing the personal context annotation 606 may involve identifying an entity that is associated with the content item 406, and associating the content item record 604 with an entity record for the entity. For example, a client device 110 may cluster all of the content item records 604 for a particular topic, such as an individual, a project, a class, or a meeting, and may aggregate all of the content items 406 and personal context annotations 606 related thereto, as an automatically compiled and comprehensive record of the myriad and disparate content items 406 that relate to the topic.

As a second example of this fourth aspect, where the content item 406 is stored at a remote location (e.g., a web page stored by a remote server), storing the personal context annotation 606 may involve storing the content item record as a snapshot of the content item 406 (e.g., preserving the entirety of the content item 406), in case the content item 406 stored by the remote server is later unavailable. Alternatively or additionally, storing the personal context annotation 606 may involve storing a reference to the remote location of the content item 406 (e.g., a URL of the content item 406). Many such techniques may be utilized to store the content item record 604 including the content item 406 and the set of personal context annotations 606 in accordance with the techniques presented herein.

As a third example of this fourth aspect, storing the personal context annotation 606 may involve a comparison of various personal contexts 520 that may relate a particular content item 406 to the user 112. For example, a user may wish to attend an event for a variety of reasons—e.g., enjoying the content of a movie; appreciating the cast of a movie; and socially interacting with other attendees of the movie—but some personal contexts 520 may be more significant to the user 112 than other personal contexts 520 for this content item 406. Accordingly, an embodiment of the presented techniques may identify a set of at least two personal contexts 520 that each describe a relevance of the content item 406 to the user 112, and determine, for each such personal context 520, a score that indicates a significance of the relevance of the personal context 520 to the user 112. The embodiment may rank the set of personal contexts 520 according to the scores, and may store, in the content item record 604, only the personal context annotations 606 for a selected number of high-ranking personal contexts 520 in the set. Such selectivity may avoid saturating the user 112 with information overload regarding various content items 406.

Figure 11:
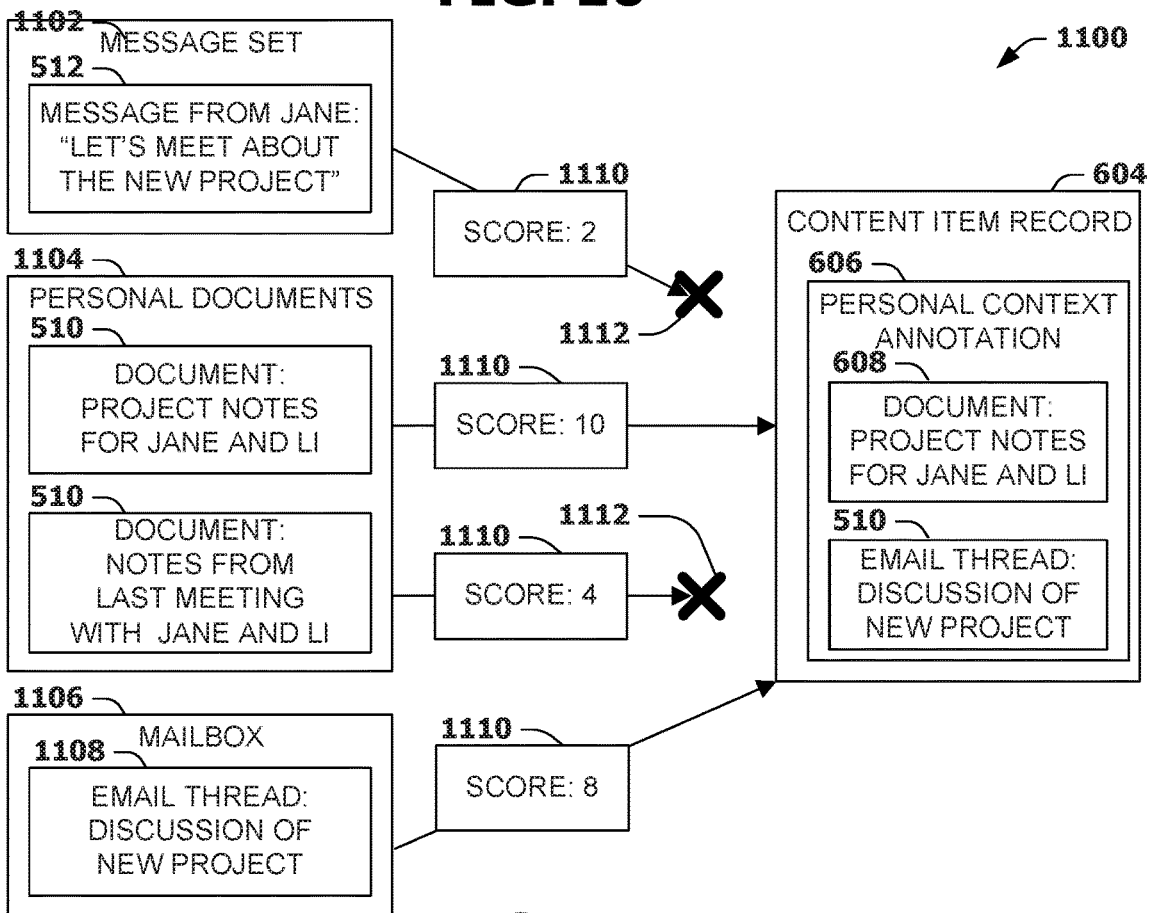
FIG. 11 is an illustration of a scenario featuring a selective presentation of personal context annotations in accordance with the techniques presented herein.

FIG. 11 presents an illustration of an example scenario 1100 in which personal contexts 520 are compared to assemble a more selective content item record 604. For example, a variety of pieces of information may provide personal context 520 for a content item 406, such as a message 512 of a message set 1002; a set of documents 510 in a personal document collection 1104; and an email thread 1108 in a mailbox 1106. An embodiment may utilize natural language parsing and semantic analysis to attribute a score 1110 to the respective pieces of information (e.g., attributing relatively high scores 1110 to a substantive email chain about a project that is the subject of a meeting, and a set of project notes about the project, while attributing relatively low scores 1110 to a simple suggestion to schedule a meeting about the project and a set of notes from a previous meeting). The embodiment may then select the highest-scoring information as the personal context annotations 606 to attach to the content item record 604, and refrain 1112 from selecting the lower-scoring information. Many such techniques may be utilized to generate personal context annotations 606, and therefore assemble the content item record 604 about the content item 406, in accordance with the techniques presented herein.

5.5. Utilizing Personal Context Annotations of Content Items

A fifth aspect that may vary among embodiments of the techniques presented herein involves the use of the content item record 604, including the personal context annotations 606, to present the personal context 520 of a content item 406 to the user 112.

As a first example of this fifth aspect, the personal context annotations 606 may be presented to the user 112 during an initial presentation of the content item 406. For example, when an email message arrives with a meeting invitation, the techniques presented herein may be promptly applied to determine the personal context 520 of the meeting to the user 112, such that even the initial notification of the meeting invitation to the user 112 is annotated with inferences of how the meeting may be relevant to the interests of the user 112.

As a second example of this fifth aspect, the personal context annotations 606 may be presented to the user 112 during a later selection of the content item 406 for presentation, such as after the user 112 has saved the content item 406 and later requests to view it. For example, a user may bookmark a web page, and the client device 110 may utilize the techniques presented herein to determine the personal context 520 of the web page to the user 112. Later, the user 112 may select the bookmark to view the web page, and the presentation may be supplemented with the presentation of personal context annotations 606 that remind the user 112 of the inferred personal context 520 of the web page to the interests of the user 112.

Figure 12:
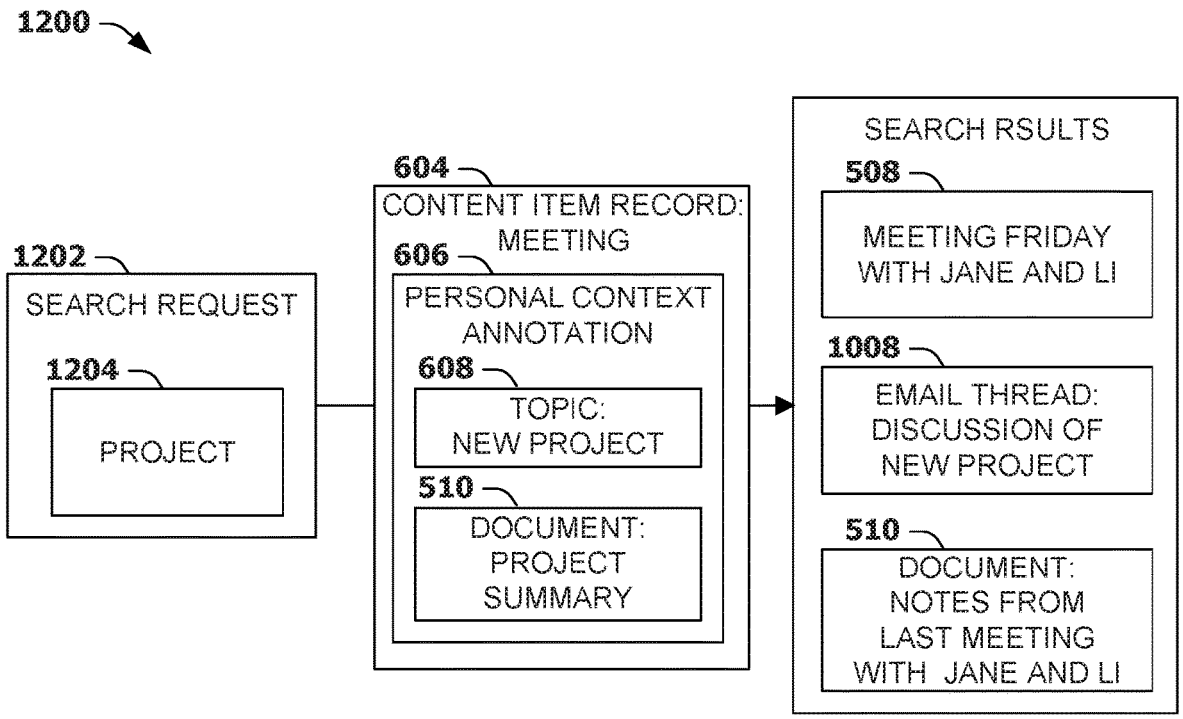
FIG. 12 is an illustration of two scenarios featuring uses of personal context annotation of various content items in accordance with the techniques presented herein.
Figure 12:
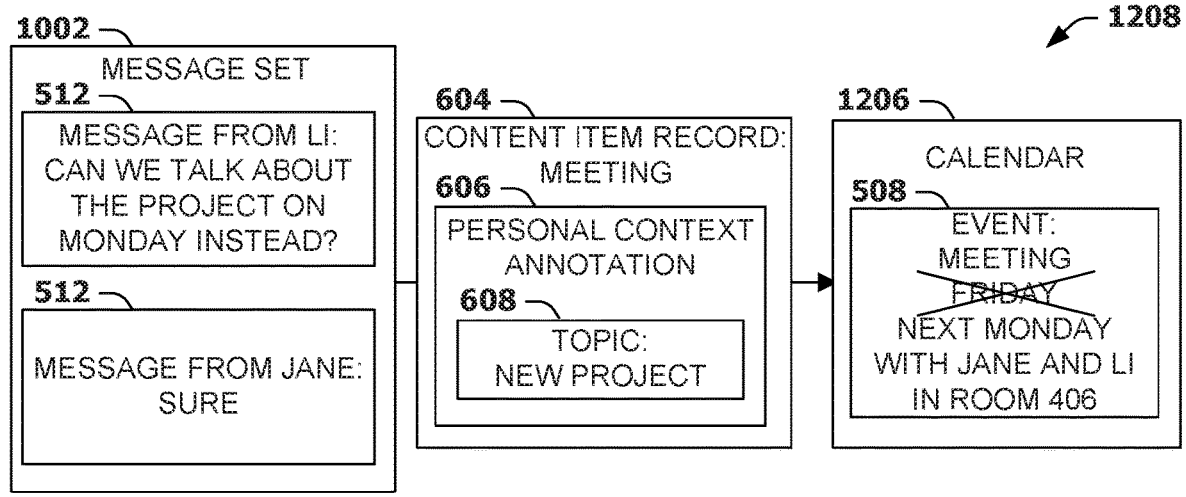

As a third example of this fifth aspect, the personal context annotations 606 may be utilized to supplement and inform searches by the user 112. In a first example scenario 1200 of FIG. 12, the user 112 initiates a search request 1202 comprising a search query 1204 for content items 406 related to a project. The previous preparation of a content item record 604 for a particular meeting may include personal context annotations 606 that include an indication that the topic 608 of the meeting is the project about which the user 112 is searching. Accordingly, the event 508 may be included in a set of search results that are responsive to the search request 1202.

As a third example of this fifth aspect, the personal context annotations 606 may be utilized to inform recommendations presented to the user 112. For example, the client device 110 may identify an opportunity recommendation to present a recommendation that is related to the personal context 520 that describes the relevance of the content item 406 to the user 112, and may present the content item to the user 112 along with a recommendation to the user that relates to the personal context annotation.

As a fourth example of this fifth aspect, the personal context annotations 606 may be utilized to update the personal data set 506 of the user 112 in response to identifying a personal context 520 that describes a relevance of the content item 406 to the user 112. For example, a detection that the user frequently chooses to attend events that involve viewing movies of a particular genre may enable an inference that the user 112 enjoys movie within the genre, and a user profile of the user 112 may be updated to inform recommendations for other movies and media that relate to the genre.

As a fourth example of this fifth aspect, the personal context annotations 606 may be utilized to inform the personal context 520 of other content items 406, such as content items 406 received before, concurrently with, or after a selected content item 406. That is, after storing a content item record 604 of the content item 406 and the personal context annotations 606 related thereto, a a second content item 406 may be received that modifies the first content item 406, and an embodiment may update the personal context annotation 606 according to the second content item 406. For example, as shown in the second example 1208 of FIG. 12, a first content item 406 has been received that involves a scheduled meeting, and an evaluation of the personal context of the meeting may have enabled an inference that the meeting involves a discussion of a particular project. Subsequently, the user 112 may receive a set of messages 512 in a message set that casually involve a request to discuss the project at a later date. Although these messages 512 do not reference the meeting, the previous context evaluation of the meeting, together with the personal context evaluation of the newly received messages 512, may enable an inference that the messages comprise a request to change the date of the meeting. Accordingly, the client device 110 may automatically update the meeting invitation in a user calendar 1206 to update the date of the meeting—not in response to a deliberate rescheduling step undertaken by the user 112 or other individuals, but based on the personal context evaluation of the messages and the previous personal context evaluation of the meeting. Many such techniques may be utilized to make use of the content item record 604, including the personal context annotations 606 arising from the personal context evaluation of the content item 406, in accordance with the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of presenting one or more content items to a user of a device comprising a processor, the method comprising:
   executing, by the processor, instructions that cause the device to:
   identify a content item transmitted to the user;
   examine a personal data set of the user, comprising at least one of one or more messages of the user or content viewed by the user within a threshold period of time, to identify a personal context that describes a relevance of the content item to the user,
   store a content item record of (i) the content item and (ii) a personal context annotation of the personal context of the content item to the user; and
   present the content item to the user by:
   retrieving the personal context annotation of the personal context from the content item record; and
   presenting to the user, with the content item, the personal context annotation of the personal context of the content item.

2. The method of claim 1, wherein the personal data set examined to identify the personal context comprises both the one or more messages of the user and the content viewed by the user within the threshold period of time.

3. The method of claim 1, wherein:
   executing the instructions further causes the device to:
   receive, from the user, a selection of a region of a document, and
   identify, within the region of the document selected by the user, the content item to be stored; and
   storing the content item record further comprises: storing the content item record for the content item in response to the selection, by the user, of the region comprising the content item.

4. The method of claim 1, wherein:
   the content item further comprises a message between the user and an individual; and
   storing the content item record further comprises: storing the content item record for the message in response to a receipt of the message between the user and the individual.

5. The method of claim 1, comprising:
   estimating a significance of the content item to the user; and
   responsive to the significance of the content item to the user exceeding a significance threshold, performing the storing the content item record.

6. The method of claim 4, wherein:
   identifying the personal context that describes the relevance of the content item to the user further comprises: identifying a set of at least two personal contexts that each describe the relevance of the content item to the user; and
   storing the personal context annotation in the content item record further comprises:
   determining, for each personal context of the set, a score that indicates a significance of the relevance of the personal context to the user;
   ranking the set according to the scores; and storing, in the content item record, personal context annotations for a selected number of high-ranking personal contexts in the set.

7. A device that presents a content item to a user, the device comprising:
a processor; and
a memory storing instructions that, when executed by the processor, cause the device to:
examine a personal data set of the user, comprising at least one of one or more messages of the user or content viewed by the user within a threshold period of time, to identify a personal context that describes a relevance of the content item to the user,
estimate a significance of the content item to the user;
responsive to the significance of the content item to the user exceeding a significance threshold, store a content item record of (i) the content item and (ii) a personal context annotation of the personal context of the content item to the user; and
present the content item to the user by:
retrieving the personal context annotation of the personal context from the content item record; and
presenting to the user, with the content item, the personal context annotation of the personal context of the content item.

8. The device of claim 7, wherein identifying the personal context that describes the relevance of the content item to the user further comprises:
examining a content body of the content item to identify, in the content body, a description of the relevance of the content item to the user; and
identifying the description of the relevance as the personal context of the content item.

9. The device of claim 7, wherein identifying the personal context that describes the relevance of the content item to the user further comprises:
determining a set of aspects involving the content item;
comparing the set of aspects with a set of interests identified in the personal data set of the user to identify a selected interest that matches a selected aspect; and
identifying the selected interest as the relevance of the content item to the user.

10. The device of claim 7, wherein identifying the personal context that describes the relevance of the content item to the user further comprises:
monitoring an action of the user involving the content item responsive to a first presentation of the content item; and
from the action of the user, inferring the personal context that describes the relevance of the content item to the user.

11. The device of claim 10, wherein executing the instructions further causes the device to:
responsive to inferring the personal context, recording an inference of the relevance to the user of content items that are similar to the content item; and
identifying the personal context of a second content item by:
determining that the second content item is similar to the content item; and
using the inference of the relevance to the user of content items that are similar to the content item.

12. The device of claim 7, wherein storing the content item record further comprises:
identifying an entity that is associated with the content item; and
associating the content item record with an entity record for the entity.

13. The device of claim 7, wherein:
the content item is stored at a remote location; and
storing the content item record further comprises: storing, with the content item record, a snapshot of the content item.

14. The device of claim 7, wherein:
the content item is stored at a remote location; and
storing the content item record further comprises: storing, with the content item record, a reference to the remote location of the content item.

15. A system for presenting one or more content items to a user of a device comprising a processor, the system comprising:
a personal context evaluator that:
identifies a content item transmitted to the user;
examines a personal data set of the user, comprising at least one of one or more messages of the user or content viewed by the user within a threshold period of time, to identify a personal context that describes a relevance of the content item to the user, and
stores a content item record of (i) the content item and (ii) a personal context annotation of the personal context of the content item to the user; and
a content item presenter that presents the content item to the user by:
retrieving the personal context annotation of the personal context from the content item record; and
presenting to the user, with the content item, the personal context annotation of the personal context of the content item.

16. The system of claim 15, wherein presenting the content item to the user further comprises: presenting the personal context annotation of the personal context, describing the relevance of the content item to the user, in response to a selection of the content item by the user.

17. The system of claim 15, wherein:
executing instructions causes the device to identify an opportunity recommendation to present a recommendation that is related to the personal context that describes the relevance of the content item to the user; and
presenting the content item to the user further comprises: presenting the recommendation to the user with the personal context annotation.

18. The system of claim 15, wherein presenting the content item to the user further comprises:
receiving, from the user, a search query for content items that are associated with a selected personal context; and
presenting the content item to the user as a search result in response to matching the personal context of the content item with the selected personal context of the search query.

19. The system of claim 15, wherein executing instructions causes the device to update the personal data set of the user in response to identifying a personal context that describes a relevance of the content item to the user.

20. The system of claim 15, wherein executing instructions causes the device to:
after storing the content item record of the content item and the personal context annotation, receiving a second content item that modifies the content item; and
updating the personal context annotation according to the second content item.

* * * * *